(12) United States Patent
Hwang et al.

(10) Patent No.: US 8,749,366 B2
(45) Date of Patent: Jun. 10, 2014

(54) REAR VIEW MIRROR FOR A VEHICLE WITH AN ANTENNA MODULE AND AN ELECTRONIC DISPLAY MODULE

(75) Inventors: Hyok-Joo Hwang, Bucheon (KR); Seok-Won Choi, Seoul (KR); Jin-Gee Choi, Seoul (KR)

(73) Assignee: SMR Patents S.a.r.l., Luxembourg (LU)

( * ) Notice: Subject to any disclaimer, the term of this patent is extended or adjusted under 35 U.S.C. 154(b) by 379 days.

(21) Appl. No.: 12/982,025

(22) Filed: Dec. 30, 2010

(65) Prior Publication Data

US 2011/0156893 A1     Jun. 30, 2011

(30) Foreign Application Priority Data

Dec. 30, 2009 (EP) .................................... 09016152

(51) Int. Cl.
*G08B 21/00* (2006.01)

(52) U.S. Cl.
USPC ........ 340/438; 340/442; 340/461; 340/691.6; 340/995.1; 348/825; 348/837

(58) Field of Classification Search
CPC .............. B60R 1/12; B60R 2001/1215; B60R 2001/1284; B60R 2001/1261; H01Q 1/3266; H01Q 1/10
USPC ................... 340/438, 442, 461, 691.6, 995.1; 348/825, 837
See application file for complete search history.

(56) References Cited

U.S. PATENT DOCUMENTS

| | | | |
|---|---|---|---|
| 4,838,650 A * | 6/1989 | Stewart et al. ................. | 359/604 |
| 5,631,638 A * | 5/1997 | Kaspar et al. ................. | 340/902 |
| 6,172,618 B1 | 1/2001 | Hakozaki et al. | |
| 2003/0090820 A1 | 5/2003 | Matsuura et al. | |
| 2004/0246607 A1* | 12/2004 | Watson et al. ................. | 359/872 |
| 2008/0266389 A1* | 10/2008 | DeWind et al. ............... | 348/115 |

FOREIGN PATENT DOCUMENTS

| | | |
|---|---|---|
| CN | 201058587 | 5/2008 |
| CN | 201138901 | 10/2008 |
| JP | 10297369 | 11/1998 |
| KR | 20080092100 | 10/2008 |

OTHER PUBLICATIONS

European Search Report for application No. EP 09016152 dated Mar. 13, 2010.

* cited by examiner

*Primary Examiner* — Nabil Syed
*Assistant Examiner* — Mark Rushing
(74) *Attorney, Agent, or Firm* — Reising Ethington PC (57) ABSTRACT

A multiple radio data service antenna module integrated in a rear view mirror being exposed towards a windscreen in an activated state enhances quality of reception of multiple radio data services and a display unit being integrated in a rear view mirror surface displaying information received by said antenna module informs a driver about relevant data of said data service without distracting the driver.

12 Claims, 4 Drawing Sheets

REAR VIEW MIRROR FOR A VEHICLE WITH AN ANTENNA MODULE AND AN ELECTRONIC DISPLAY MODULE

The invention is based on a priority patent application EP 09016152.2 which is hereby incorporated by reference.

BACKGROUND ART

1. Field of the Invention

The present invention pertains to a rear view mirror for a vehicle comprising a mirror housing, an antenna module arranged on the backside of said mirror housing for receiving data of at least one radio data service, an electronic display unit being arranged on the front side of said mirror and an electronic unit in electrical communication with said antenna module and said display unit for displaying at least portions of said data received by said antenna module onto said display unit, wherein an antenna module sealing mechanism hiding said antenna module inside a casing of said mirror housing in a deactivated state and exposing said antenna module towards a driving direction/windscreen side in an activated state, whereby said antenna module is arranged in a recess of said mirror housing and said antenna module sealing mechanism comprises a slidable or pivotable door opening said recess in the activated state and closing said recess in the deactivated state wherein said antenna module sealing mechanism comprises an electromotor unit for opening and closing said door.

2. Description of the Related Art

Modern vehicles are equipped with at least one rear view mirror for observing backward traffic. Outside rear view mirrors are often mounted onto a door or near to a door pillar onto the vehicle's outer chassis while inside rear view mirrors are usually mounted onto the vehicle's inner roof or onto an inside surface of the front windscreen. In recent times, such rear view mirrors are increasingly equipped with information displays informing a driver about clock-time, compass direction, outer temperature or other sensor data.

On the other hand, various modern board navigation, communication and entertainment systems, such as navigation systems, mobile phones, DAB radios (Digital Audio Broadcasting), DMB receivers (Digital Multimedia Broadcasting) etc., depend on high frequency radio data services which require high-quality radio signal reception in a microwave frequency range. A degraded radio signal reception decreases the receiving rate of microwave signals from navigation satellites or multimedia and communication service antennas, such that the radio data service malfunctions or breaks down, thus annoying the driver and effecting his/her driving behavior. A high-quality signal reception quality can be provided by a direct line of sight and an exact alignment towards a transmitting station, such as a satellite or a base station antenna. As a consequence, placing an antenna in the vicinity of the front windscreen offers an optimal line of sight in a driving direction but a fixed installation of one or multiple antennas inside the passenger cabin, particularly near to the front windscreen, can disturb a driver's view onto the street ahead. On the other hand, a temporary installation of one or multiple antennas onto the windscreen also causes problems with a secure attachment of an antenna structure to the windscreen and also affects the driver's sight onto the street. For using multiple radio data services, individual antennas have to be installed, whereby a temporary installation is inconvenient on the part of the driver. Therefore, multi-service antenna modules have been developed comprising one or more antenna structures, preferably for a microwave frequency range of 300 MHz to 500 GHz.

Antenna modules of this generic type can also be used for receiving and transmitting data to an Electronic Toll Collection System (ETCS) allowing toll collection without vehicle stops at toll gates. ETCS relies on a wireless telecommunication between moving vehicles and Road Side Equipment (RSE) set up on roadways. In general ETCS helps to prevent traffic congestions near toll gates and increases traffic safety and speed. Thereby, a reliable radio communication between the on-board ETCS unit and the RSE is extremely vital for the toll system functioning and the driver's safety when driving through toll gates. In case of an unreliable radio reception, vehicles suddenly have to stop because toll gates do not open properly, which can cause rear-end collisions and long traffic jams. As a consequence, a high-quality antenna reception is vital for the driver's safety with respect to a reliable satellite-based traffic navigation, radio-based ETCS and traffic regulation system which demands a high quality radio reception and an exact alignment of the on-board antenna structure towards a satellite, RSE antenna respectively.

From US 2003 0090820 A1 an inside rear view mirror is known which comprises a built-in antenna inside a housing of the rear view mirror. The antenna is designed for ETCS communication and is mounted at an angle of approximately 20° in the up and down direction and parallel to the left and right direction with respect to the vehicle's driving direction. The antenna is mounted inside the mirror housing such that the antenna does not have a direct line of sight to the RSE and the housing material degrades the radio communication quality between integrated antenna and RSE antenna.

CN 201 058 587 Y and CN 201 138 901 Y discloses an rearview mirror with a mirror housing, an antenna module arranged on the backside of said mirror housing, an electronic display unit being arranged on the front side of said mirror and an electronic unit. The rear view mirror further comprises a manually operated antenna module sealing mechanism which can hide and expose said antenna towards a driving direction.

U.S. Pat. No. 6,172,618 B1 describes an attachable rearview mirror being mountable to an existing room mirror of a vehicle, said rearview mirror consists of a mirror housing, an antenna module arranged on the backside of said mirror housing and an electronic display unit being arranged on the front side of said mirror. The antenna module is adjustably mounted and can be directed towards a driving direction of the vehicle.

SUMMARY OF THE INVENTION

It is an object of the present invention to provide a rear view mirror comprising an antenna module for a high-quality radio signal reception and for displaying information and images on an electronic display within the mirror's vicinity, thus offering an optimal visibility of the street ahead and a reliable radio data service quality. Furthermore, it is an object of the present invention to propose a rear view mirror providing a multi-purpose electronic display for informing the driver about information of the radio data service and other vital data without distracting the driver's attention from the traffic, thus enhancing the driver's security. A further object of the present invention is to integrate a display and an antenna module in a rear view mirror, thus saving production costs and simplifying operation of the electronic display and radio data service.

These objects are achieved by the features of the independent claims. The other claims and the description disclose advantageous embodiments of the present invention.

According to a first aspect of the invention, a rear view mirror for a vehicle comprising a mirror housing, an antenna module arranged on the backside of said mirror housing for receiving data of at least one radio data service, an electronic display unit being arranged on the front side of said mirror and an electronic unit in electrical communication with said antenna module and said display unit for displaying at least portions of said data received by said antenna module onto said display unit is provided. The rear view mirror according to the present invention further comprises an antenna module sealing mechanism which can hide said antenna module inside a casing of said mirror housing in a deactivated state and can expose said antenna module towards a driving direction, which is a windscreen side for an inside rear view mirror in an activated state. Radio data services, such as GPS (Global Positioning Service), GSM (Global System for Mobile Communication), UMTS (Universal Mobile Telecommunications System), DAB/DMB (Digital Audio/Multimedia Broadcasting), ETCS (Electronic Toll Collection System) or other services use radio frequencies in a microwave frequency range for wireless communication, whereby reception quality severely suffers from material obstacles in a line of sight between sending antenna, such as satellite transponder or base station, and receiving antenna. Therefore, the present invention proposes to expose an antenna module attached to a mirror housing of a rear view mirror towards a driving direction, i.e. a front windscreen side of a vehicle in an activated state, which means a state in which said radio data service is activated, and to hide said antenna module inside a casing of said mirror housing in a deactivated state when the radio data service deactivated. Furthermore, an electronic display is arranged on a front side of the mirror housing, preferably within the mirror surface, for displaying at least data of said radio data service and an electronic unit for receiving, processing and displaying data of said radio data service received by said antenna module on said display. In case of a GSM, UMTS, ETCS or other radio data service, also a transmitting function of said electronic unit and said antenna module can be provided for establishing a bidirectional communication between said electronic unit and a base state or RSE, e.g. for establishing a telephonic or internet communication, identifying a vehicle ID or updating a balance account of an ETCS credit card. The display arranged within the mirror housing displays vital information to the driver, whereby the mirror is placed within the driver's line of sight and without limiting the driver's perspective onto the road ahead.

According the invention, said antenna module is arranged in a recess of said mirror housing and said antenna module sealing mechanism comprises a slidable or pivotable door, opening said recess in an activated state and closing said recess in a deactivated state. A moveable door for exposing/hiding said antenna module in a recess of said mirror housing is a mechanically simple structure for increasing radio reception of said antenna module. A sliding or pivoting mechanism can be realized by using an electromotor transforming the rotating shaft movement of the electromotor into a linear or stewing movement of said door. Opening said door exposes said antenna module towards a driving direction of the vehicle and closing said door hides said antenna module in a deactivated state.

Furthermore and according to the invention said antenna module sealing mechanism comprises an electromotor unit for opening and closing said door. An electromotor is a small, cheap and lightweight driving means for pivoting or sliding said door respectively and can be easily arranged inside a mirror housing.

In general, the rear view mirror can be of any type of outside or inside rear view mirror of a vehicle, or can be a makeup mirror of a vehicle's sun shield. According to a preferable embodiment, such a rear view mirror can be an inside rear view mirror. Such an inside rear view mirror is usually centrally positioned in the upper half of a front windscreen and is usually mounted on the ceiling of a vehicle's roof or is directly fixed onto the windscreen. An inside rear view mirror can be touched by a driver so that buttons or switches for controlling the electrical functions of said electronic display and said radio data service received by said antenna module can also be arranged on the mirror housing.

In general, said electronic unit can be placed in any optional position within the driver's cabin. Thereby, an electrical connection between a power supply, said antenna module, said electronic display and said electronic unit has to be provided. According to a favorable embodiment, said electronic unit can be arranged inside said mirror housing such that merely a power supply cable has to be provided and said mirror can be assembled as a single mirror unit, thus reducing installation time and costs.

According to a preferred embodiment, a speaker in electrical connection with said electronic unit for outputting at least portions of said data received by said antenna module is arranged in said mirror housing. Thereby, the speaker can also be electrically connected with said electronic unit and can inform the driver about information via acoustic signaling or via speech response, whereby an audio/speech response module can be comprised by said electronic unit. Therefore, a speaker providing acoustic signals and/or spoken information to the driver in combination with visual data shown onto the electronic display increases the driver's safety and presents vital information without distracting the driver's attention from the traffic ahead. Furthermore, it is likewise conceivable that an additional microphone can also be comprised by said mirror housing such that the embodiment of a mirror can also be used as a handsfree front end of a mobile phone with speaker, microphone, electronic unit with RF electronic section and electronic display.

According to a preferred embodiment, said antenna module is designed for receiving frequency signals of multiple radio data services, preferably frequency signals in a microwave frequency range, and particularly of two or more radio data services from the group of DVB (Digital Versatile Broadcasting), DAB (Digital Audio Broadcasting), DMB (Digital Multimedia Broadcasting), GPS (Global Positioning System), WLAN (Wireless LAN), Bluetooth, GSM (Global System for Mobile Communications), UMTS (Universal Mobile Telecommunications System), WiMax (Worldwide Interoperability for Microwave Access), ETCS (Electronic Toll Collection System) frequency signals. Receiving radio frequencies of more than one radio data service provides a multi-service information mirror eliminating the need for distracting antennas in the driver's cockpit.

In general, the antenna module can comprise a single antenna structure for receiving radio signals of multiple radio data services. Generally such a multi-frequency antenna structure has a non-optimal reception quality for the radio frequencies of all radio data services to be received by said antenna module. According to the aforementioned embodiment, it is favorable if said antenna module comprises at least two antenna structures for receiving frequency signals of different radio data services. Thus, each antenna structure can be optimized for radio reception of the frequency of each individual radio data service or can be optimized for reception of a group of radio data services.

According to a preferred embodiment, said electronic unit can comprise receiving means and transmitting means designed for receiving and transmitting data via said antenna module to a remote location outside of the vehicle thus providing a bidirectional communication channel. Radio data services often require a bidirectional communication channel, such as GSM/UMTS for a receiving and transmitting channel, but also for ETCS for transmitting a vehicle identification data and charging a credit card for using a toll-based road. For using such bidirectional radio data services, said electronic unit and also said antenna module has to comprise not only receiving but also transmitting means for transmitting data from the vehicle towards a receiving base station antenna or RSE.

In general, said antenna module and also said electronic display unit can be activated manually in response to a driver's request or automatically upon a request of a radio data service, e.g. an incoming or outgoing GSM/UMTS call or an approach to an RSE of an ETCS. Preferably, the electronic unit can be in electrical connection with a power supply via a vehicle's ignition switch and said activated state is a motor running state (KEY ON) and/or an ignition on (ACC ON) state and said deactivated state is an ignition off (KEY OFF) state. Activating and deactivating said antenna module upon the status of an ignition switch automatically controls the behavior of said electronic unit and said antenna module sealing mechanism for exposing said antenna module in an activated state and hide said antenna module in a deactivated state, and is a simple method for activating reception of said radio data service.

By using a pivotable door, said antenna module can favorably be arranged inside the mirror housing recess on an inside surface of said pivotable door. In an opened state, the antenna module is aligned towards a normal direction of said inside surface, thus facing towards the sky in a driving direction. Using a slideable door, said antenna module can favorably be arranged on a backside surface of said recess facing into a driving direction when said door is in an opened position.

Using an electromotor unit, a start/stop mechanism for controlling start and stop of said electromotor is required. It is highly favorable to use a current control element for switching off said electromotor when said casing is in an opened or closed state, preferably when said door of said casing hits an opened-state stopper or a closed-state stopper blocking further movement of said door. If said door hits an opened-state/closed-state stopper, the movement of said door is suddenly blocked and an over-current runs through said blocked electromotor. A current control element sensing said over-current can detect an opened-state/closed-state of said door and can switch off a power supply to said electromotor, thus providing an efficient start/stop end switch of said antenna module sealing mechanism. No additional sensors or switches and no additional wiring are required, thus reducing costs and electrical complexity.

According to a preferred embodiment, said electronic unit can be in electrical connection with at least one sensor, preferably a temperature sensor, a humidity sensor, a tire pressure sensor, a fuel sensor, a driving direction sensor, a credit card balance sensor for displaying sensor data on said electronic display unit, such as temperature, humidity, driving direction, tire pressure, fuel level or balance of a credit card for ETCS. The electronic display unit, a favorable speaker and also a favorable microphone being comprised by said mirror housing can be used for informing a driver about vital data of these sensors and for interacting with the driver basing on a voice control functionality provided by the electronic unit, thus increasing multi-functionality of said mirror. The electronic display unit can show not only radio data service based information but also other information of different vehicle sensors, usually displayed on an instrument panel of a vehicle, thus reducing display complexity of the instrument panel.

In general, the display can be located on an additional panel attached to the mirror or can also be placed on a slideable platform deploying from an inside of the mirror housing in an activated state and retracting inside the housing in a deactivated state. According to a favorable embodiment, said display unit comprises a LCD, Plasma or LED display being arranged in a portion of a mirror surface and being visible in an active displaying state, preferably in a reverse gear driving state, and being invisible in a deactivated displaying state. Arranging said electronic display unit within said mirror surface does not enlarge the mirror's outer contour, thus leaving the mirror's dimensions unchanged. A LCD display can be illuminated by a backside lamp, and a LED or Plasma display is self-illuminating such that hiding an LED, Plasma or LCD display behind a thin reflecting mirror surface makes the electronic display invisible within the reflecting mirror surface in a deactivated state and makes the display unit only visible in an activated, i.e. in an illuminated state. In this way, some portions of the mirror surface can be used for displaying data only in an activated state when a driver demands information from the electronic display unit and are reflecting as mirror surface in a deactivated state.

According to a preferred embodiment, said mirror housing can comprise at least one electrical switch or button in electrical connection with said electronic unit for controlling at least one function of said electronic unit, preferably a power on/off button for an ETCS, a balance button for displaying a balance of a credit-card for ETCS, a sound button for controlling sound of said speaker, a temperature/humidity/driving direction button for switching information on said display, and/or a tire pressure button for displaying tire pressure status on said display. The driver can control the behavior of sad electronic unit and display unit by pressing said button or switch. Furthermore, he/she can demand information about the ETCS credit balance, can change speaker output settings and can demand other sensor data, such as outside temperature, fuel consumption, fuel status, tire pressure status, etc.

BRIEF DESCRIPTION OF THE DRAWINGS

The present invention together with the above-mentioned and other objects and advantages may best be understood from the following detailed description of the embodiments, but is not restricted to the embodiments, wherein it is schematically shown in.

DETAILED DESCRIPTION OF THE PREFERRED EMBODIMENTS

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

Figure 1:
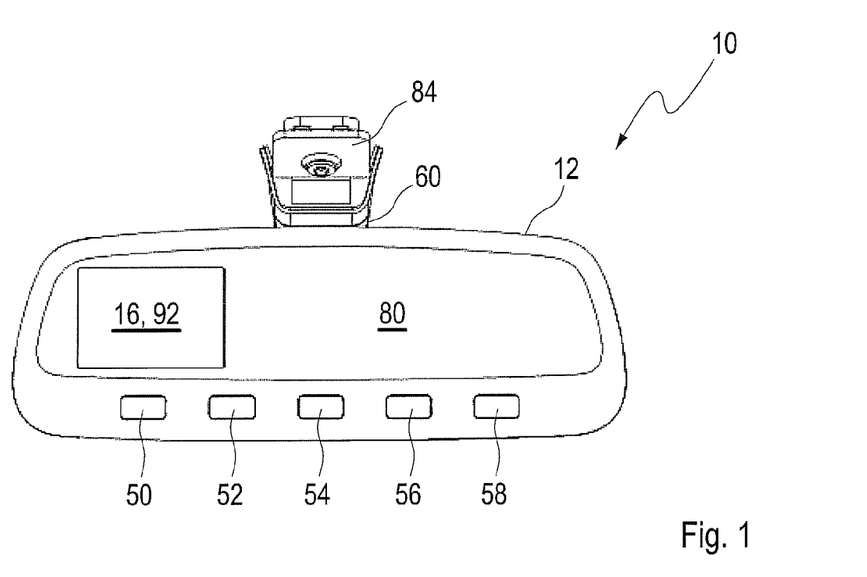
FIG. 1 a front side of an embodiment of an inside rear view mirror according to the present invention.

FIG. 1 depicts a front view of an exemplary embodiment of an inside rear view mirror for a vehicle, the inside rear view mirror 10 comprises a mirror housing 12, wherein in a front side of the mirror housing 12 a mirror surface 80 is integrated in the surface of the mirror housing 12. Within the mirror surface 80, an electronic LCD display unit 16, 92 is arranged on a left portion of the mirror housing 12 for displaying multiple pieces of information to the driver. Within a portion of the front side of the mirror housing surface, five buttons or switches 50 to 58 are arranged for controlling various functions of the electronic unit 18 which is arranged inside the rear view mirror 10. The display unit 16, 92 shows information, such as credit balance for a card of the ETCS (Electronic Toll Collection System), outside temperature, outside humidity, driving direction, tire pressure of the wheels and further pieces of information. The LCD display 92 is invisible when it is not showing any information, and is only visible when it displays information for the driver. The visibility/invisibility of the mirror can be provided by a backlight lamp, illuminating the backside of the LCD display only in an activated state, thus leaving the surface of the rear view mirror 80 reflecting in a deactivated state.

Figure 2:
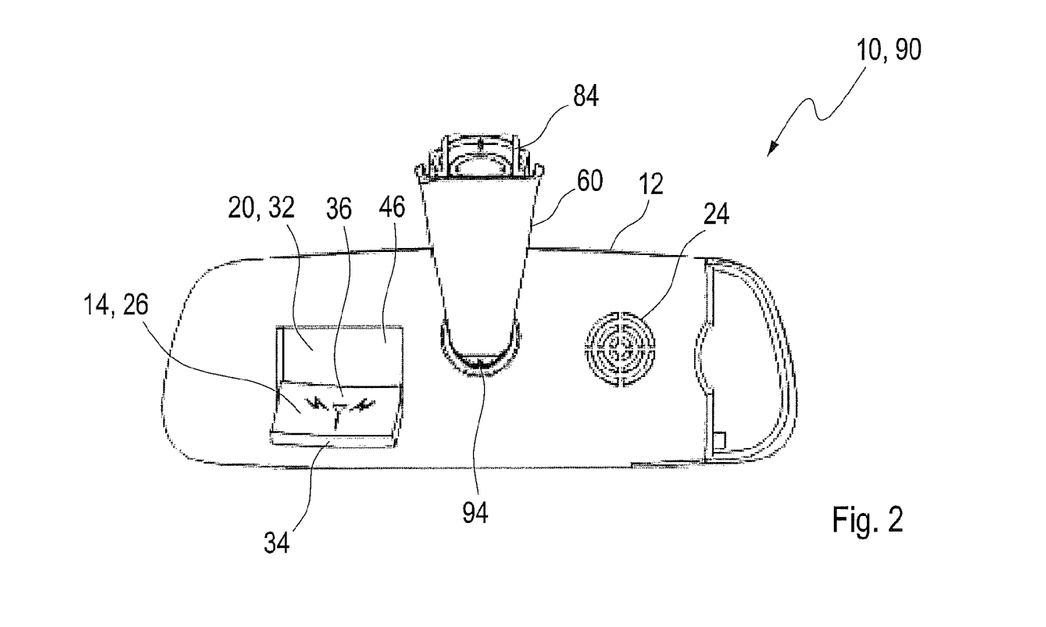
FIG. 2 a backside of said embodiment of an inside rear view mirror according to the present invention.

FIG. 2 shows a backside of said rear view mirror 10 according to the present invention, whereby the backside of a housing 12 of said mirror 10 is aligned towards a windscreen side 22 of the vehicle 62. The backside surface of the mirror housing 12 comprises a speaker outlet 24, whereby a speaker integrated in the inside of the mirror housing 12 can produce signals and voice sounds informing the driver about information already shown on the LCD display or additionally to the displayed information, or can warn the driver in case of critical driving conditions, such as low fuel, low tire pressure or low temperature, causing black ice on the street. The backside surface of the mirror housing 12 also comprises a recess 32 of an antenna module casing 20 in which an antenna module 14 with an antenna structure 26 (not shown in detail) is disposed. The antenna module casing 20 further comprises a pivotable door 34 which can be pivoted inside the recess 46 sealing an antenna module 14, which is arranged on the inside surface of the pivotable door 34. FIG. 2 depicts the antenna module 14 in an activated state, wherein the pivotable door 34 is opened, exposing the antenna structure of the antenna module 14 towards a windscreen side 22 i.e. towards a driving direction of the vehicle. The antenna mirror housing 12 is attached to a stay 60 with a ball joint 94, allowing to adjust the alignment of the mirror 10 according to the driver's position. The stay 60 can be fixed to a ceiling of a vehicle roof with a mirror sealing mount 84. The antenna module 16 can comprise a foldable antenna designed for receiving radio signals of a GPS (Global Positioning System), DMB (Digital Multimedia Broadcasting) and ETCS (Electronic Toll Collection System) radio data service, such that the antenna module 16 comprising a single antenna structure or multiple antennas is designed for receiving radio frequencies of different radio data services. The antenna module 16 can be designed to comprise a foldable antenna in order to increase the receiving rate, whereby in an activated state, where the KEY-ON or ACC switch is activated, the antenna module casing 20 is opened automatically and the antenna structure is exposed towards the windscreen side 22 of the vehicle. In a deactivated state (KEY-OFF state), the antenna module casing 20 is closed automatically by an antenna module sealing mechanism 76.

Figure 3:
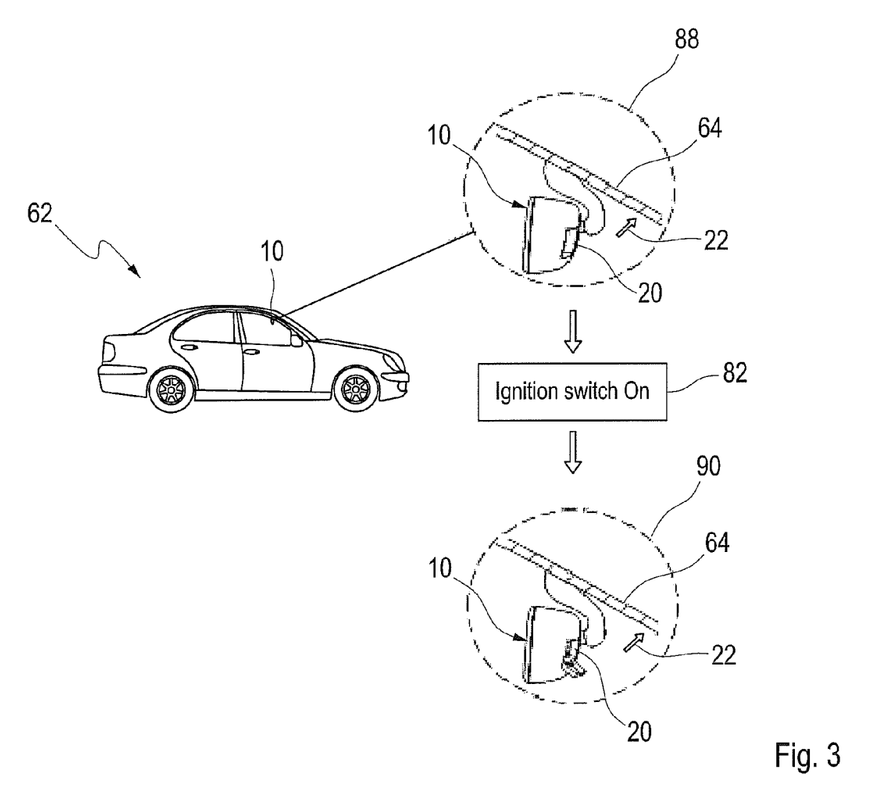
FIG. 3 a schematic representation of said embodiment of an inside rear view mirror according to the present invention in a deactivated and an activated state.

FIG. 3 shows a schematic representation of an inside rear view mirror 10 according to the present invention in a deactivated state 88 and an activated state 90. Thereby, the inner rear view mirror 10 is attached to a windscreen 64 of a vehicle 62, such that a stay 60 connects the mirror housing 12 to the windscreen 64. In a deactivated state, which means an ACC-OFF state or KEY-OFF state, the antenna module casing 20 is closed. When the ignition switch 82 is turned on, the antenna sealing mechanism 76 is activated and the pivotable door 34 of the antenna module casing 20 opens a recess 32 of the backside mirror housing 12, exposing the antenna module 14 towards a windscreen side 22, i.e. towards a driving direction of the vehicle 62. The deactivated state 88 and the activated state 90 are automatically switched over according to the state of the ignition switch 82.

Figure 4:
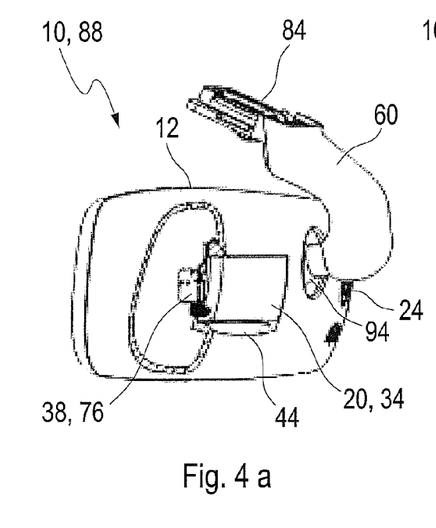
FIG. 4a, 4b an elevated representation of said embodiment of an inside rear view mirror according to the present invention in a deactivated (FIG. 4a) and an activated state (FIG. 4b)

FIG. 4 displays an elevated representation of an inside rear view mirror 10 according the present invention in a deactivated state 88 (FIG. 4a) and in an activated state 90 (FIG. 4b). The mirror 10 of a deactivated state 88 is mounted on a ceiling of a vehicle roof by a mirror sealing mount 84, whereby a ball joint 94 connects the stay 60 with the mirror housing 12, allowing an adjustment of the mirror housing 12 according to the driver's head position. The antenna module casing 20 comprises an antenna module sealing mechanism 76, which is depicted in an elevated part of the schematic drawing of FIG. 4. The antenna module sealing mechanism 76 comprises an electromotor unit 38 designed for opening and closing the pivotable door 34 for opening a recess 32 of the backside of the mirror housing 12, thus exposing an antenna module 14 to the windscreen side 22 of the vehicle. In a closed/deactivated state 88, a opened-state stopper 44 can be identified which stops the pivotable door 34 from further opening, thus limiting the opening angle of the pivotable door 34 and defining the alignment of the antenna module 20 towards the windscreen side 22. The opening and closing motion of said pivotable door 34 is provided by an electromotor unit 36 of the antenna module sealing mechanism 76. In an opened state 90, shown in FIG. 4b, a recess 32 of the backside mirror housing surface 12 is opened, whereby an inner surface of the recess 32 functions as a closed-state stopper 46, limiting the closing motion of said pivotable door 34.

Figure 5:
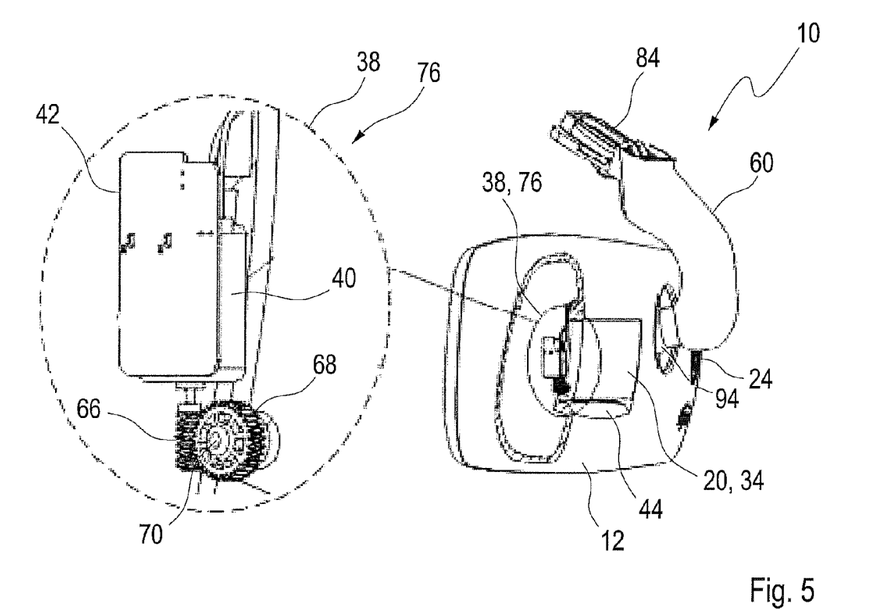
FIG. 5 an elevated and zoomed view of an antenna module sealing mechanism of said embodiment of an inside rear view mirror according to the present invention.
Figure 6:
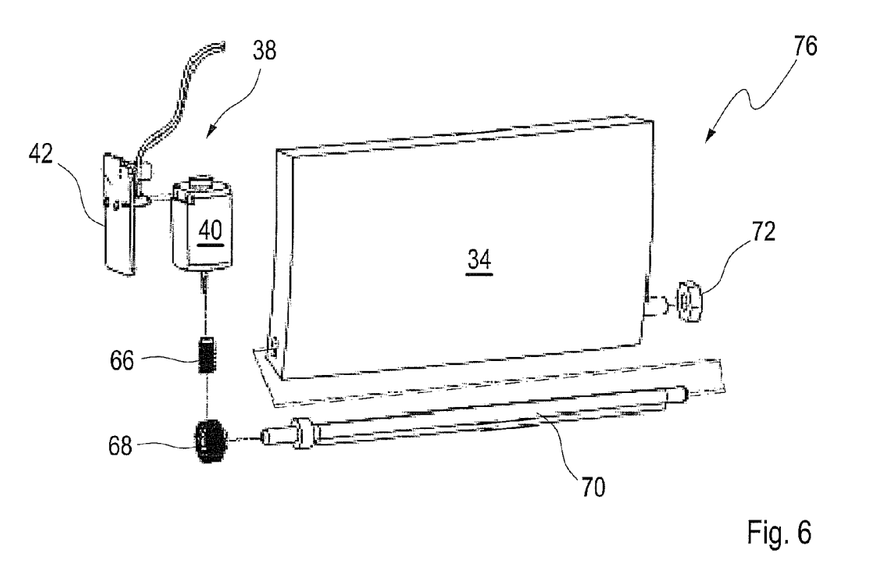
FIG. 6 an exploded view of the antenna module sealing mechanism of said embodiment of an inside rear view mirror according to the present invention.

FIG. 5 shows in an elevated and zoomed view the antenna module sealing mechanism 76 comprising an electromotor unit 38 for bringing the pivotable door 34 in an open position, i.e. activated state 90 or in a closed position, i.e. deactivated state 88 of the inside rear view mirror 10. The antenna module sealing mechanism 76 comprises an electromotor unit 38 which consists of an electromotor 40, an electromotor printed circuit board (PCB) with a current control element, a driving worm 66 which is driven by the electromotor 40 and a worm wheel 68 driving a shaft 70 of the pivotable door 34 for opening and closing the door. As shown in FIG. 6 illustrating an exploded view of the antenna module sealing mechanism 76 of said inside rear view mirror 10 according to the present invention, the shaft 70 has a flank side rotatably fixing the pivotable door 34 to the shaft 70, and a worm wheel 68 and a nut 72 are attached at the outer axial sides of the shaft 70 securing the shaft 70 for a rotatable movement of the pivotable door 34. The electromotor unit 38 comprising the electromotor 40 and the electromotor PCB 42 with the current control element drives the worm wheel 68 which rotates the shaft 70 for opening and closing of the pivotable door 34. The antenna module sealing mechanism 76 does not comprise sensors for sensing the opened or closed state of the pivotable door 34. In contrast thereto, an opened-state stopper 44 and a closed-state stopper 46, being displayed in FIG. 4, are arranged for limiting the opening or closing movement of the pivotable door 34. In case that the door 34 reaches a stopping element 44, 46, the driving movement of the electromotor 40 is blocked, thus increasing the electric current of the electromotor 40. The electromotor PCB 42 comprises a current control element sensing an increased current in a state, when the pivotable door 34 hits an opened-state or closed-state stopping element 44, 46, whereby the current control element switch off the current of the electromotor 40, thus deactivating the antenna module sealing mechanism 76 due to current control of the electromotor unit 38. If a ignition switch on or ACC ON signal is inputted into the electromotor PCB 42, the electromotor 40 rotates forward. The worm 66 drives the worm wheel 68 which is connected to the shaft 70, and when the electromotor 40 rotates forward, the pivotable door 34 opens and exposes the antenna module 14 towards the windscreen side 22. If the pivotable door 34 stops at the opened-state stopper 44, an over-current is caused by an extreme overload of the electromotor 40. The current control element of the PCB 42 senses this over-current and cuts off the electric power supply to the electromotor 40. If the ignition switch is turned off or if ACC is switched off, the antenna module sealing mechanism 76 drives in a reverse direction and hides the antenna module 12 in the recess of the mirror housing 32. The pivotable door 34 stops at the closed-state stopper 46, whereby an over-current caused by the extreme overload of the electromotor 40 is cut off by the current control element of the electromotor PCB 42.

Figure 7:
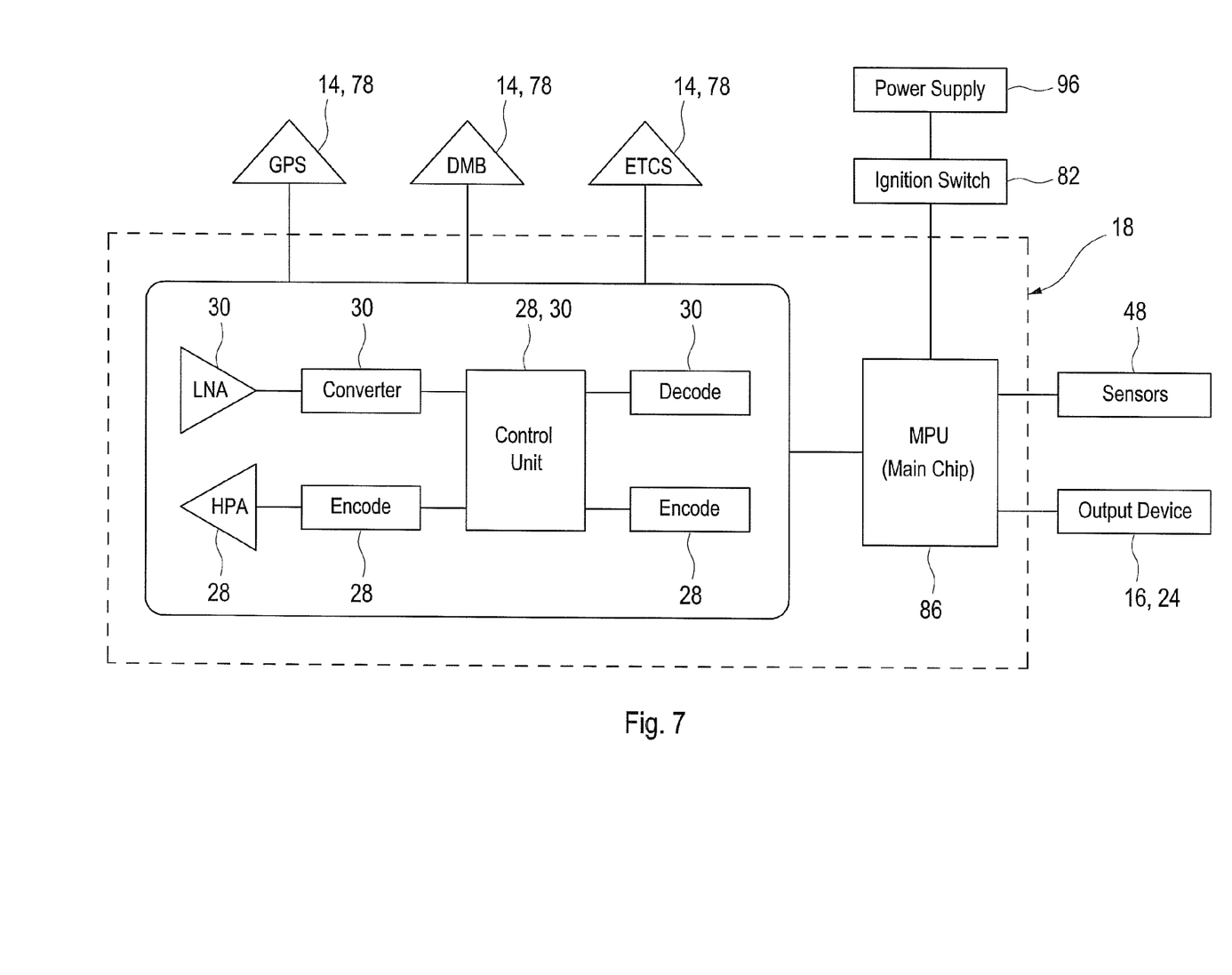
FIG. 7 a block diagram representation of an electrical configuration comprising an electrical unit of said embodiment of an inside rear view mirror according to the present invention.

Finally, FIG. 7 displays a block diagram representation of an electrical configuration comprising an electrical unit 18 of said embodiment of an inside rear view mirror 10 according to the present invention. The electronic configuration of an embodiment of said inside rear view mirror comprises a power supply 96 which provides electric power to an electronic unit 18 of the inside rear view mirror 10, when an ignition switch 82 is turned on. In case that the ignition switch 82 is turned off, the antenna module sealing mechanism 76 is forced to seal the antenna module 16 inside the antenna module casing 20 and the electronic unit 18 is turned off. The electronic unit 18 is connected to a single or to multiple sensors 48 for sensing outside temperature, humidity, tire pressure, fuel level, driving/compass direction and/or is connected to a credit card sensor for checking the balance of a credit card for an ETCS system, and/or various other sensors being useful for informing the driver about the vehicle and traffic status. Furthermore, the electronic unit 18 is connected to one or several output devices, such as an LCD display 16, 92 or a speaker 24 arranged inside the mirror housing 12 of the inside rear view mirror 10. The electronic unit 18 comprises an MPU (Main Processor Unit) which can include RAM, ROM, CPU and other typical computer hardware elements and also comprises a high-frequency radio transmission/receiving unit, including radio receiving and transmitting means 28, 30 for communication with a single or multiple radio data services 78. Thereby, the receiving means comprise an LNA (Low Noise Amplifier), an antenna converter, a control unit and a decoder unit and the transmitting unit 28 comprises an antenna signal encoder, a control unit, an RF encoder and an HPA (High Power Amplifier). The RF unit is designed for receiving and transmitting radio data from/to different radio data services 78 via an antenna module 14 for GPS, DMB and ETCS communication. The antenna module 14 is designed for microwave frequency transmission and reception and the electronic unit 18 is capable of communicating with GPS, DMB and ETCS radio data services. Sensors for sensing temperature, humidity and tire pressure etc, are also coupled to the electronic unit 18 and an output device can comprise an electronic LCD display unit 16, 92 and a speaker 24 for graphically displaying and acoustic signaling said information as a signal tone or as a voice message. The speaker 24 can acoustically output the information when the driver presses a button to hear said information.

The proposed rear view mirror unifies a display unit and a slidable antenna module in one mirror casing, thus saving costs and simplifying the driver's interaction. A display unit is provided to show relevant information about radio data services to a driver received by said antenna module, whereby no additional antenna configuration is needed and the line of sight for the driver is not disturbed.

We claim:

1. A rear view mirror for a vehicle comprising a mirror housing, an antenna module arranged on the backside of said mirror housing having an antenna electrically connected thereto for receiving data of at least one radio data service, an electronic display unit being arranged on the front side of said mirror and an electronic unit in electrical communication with said antenna module and said display unit for displaying at least portions of said data received by said antenna module onto said display unit, wherein an antenna module sealing mechanism hiding said antenna module inside a casing of said mirror housing in a deactivated state and exposing said antenna module towards a driving direction/windscreen side in an activated state, whereby said antenna module is arranged in a recess of said mirror housing and said antenna module sealing mechanism comprises a pivotable door with said antenna secured thereto, said pivotable door opening said recess in the activated state moving said antenna away from said backside of said mirror housing and closing said recess in the deactivated state moving said antenna back toward said backside of said mirror housing wherein said antenna module sealing mechanism comprises an electromotor unit for opening and closing said door, wherein said electronic unit is in electrical connection with a power supply over a vehicle's ignition switch and said activated state is a motor running state (KEY ON) or an ignition on (ACC ON) state and said deactivated state is an ignition off (KEY OFF) state of said vehicle's ignition switch.

2. Rear view mirror according to claim 1, wherein said rear view mirror is an inside rear view mirror.

3. Rear view mirror according to claim 1, wherein said electronic unit is arranged inside said mirror housing.

4. Rear view mirror according to claim 1, wherein a speaker in electrical connection with said electronic unit for outputting at least portions of said data received by said antenna module is arranged in said mirror housing.

5. Rear view mirror according to claim 1, wherein said antenna module is designed for receiving frequency signals a microwave frequency range and particularly of two or more radio data services from the group of DVB (Digital Versatile Broadcasting), DAB (Digital Audio Broadcasting), DMB (Digital Multimedia Broadcasting), GPS (Global Positioning System), WLAN (Wireless LAN), Bluetooth, GSM (Global System for Mobile Communications), UMTS (Universal Mobile Telecommunications System), WiMax (Worldwide Interoperability for Microwave Access), ETCS (Electronic Toll Collection System) frequency signals.

6. Rear view mirror according to claim 5, wherein said antenna module comprises at least two antenna structures for receiving frequency signals of different radio data services.

7. Rear view mirror according to claim 1, wherein said electronic unit comprises receiving means and transmitting means designed for receiving and transmitting data via said antenna module to a remote location outside of the vehicle for a bidirectional communication.

8. Rear view mirror according to claim 1, wherein said antenna module is arranged on an inside surface of said pivotable door.

9. Rear view mirror according to claim 1, wherein said electromotor unit comprises a current control element for switching off said electromotor when said casing is in an opened or closed state, when said door of said casing hits an opened-state stopper or a closed-state stopper.

10. Rear view mirror according to claim 1, wherein said electronic unit is in electrical connection with at least one sensor, including a temperature sensor, a humidity sensor, a tire pressure sensor, a fuel sensor, a driving direction sensor, a credit card sensor for displaying data of said sensor on said display unit such as temperature, humidity, driving direction, tire pressure, fuel level or balance of a credit card for ETCS.

11. Rear view mirror according to claim 1, wherein said display unit comprises a LCD, Plasma or LED display being arranged in a portion of a mirror surface and being visible in an active displaying state, and not being visible in an deactivated displaying state.

12. Rear view mirror according to claim 1, wherein said mirror housing comprises at least one switch or button in electrical connection with said electronic unit for controlling a power on/off button for an ETCS, a balance button for displaying a balance of a credit card for ETCS, a sound button for controlling sound of said speaker, a temperature/humidity/driving direction button for switching information on said display, or a tire pressure button for displaying tire pressure status on said display.

* * * * *